March 23, 1948.    C. C. WATSON    2,438,242
CATALYTIC REACTOR
Filed May 15, 1943

Inventor:
Charles C. Watson
By: Lee J. Gary
Attorney

Patented Mar. 23, 1948

2,438,242

UNITED STATES PATENT OFFICE 2,438,242

CATALYTIC REACTOR

Charles C. Watson, Chicago, Ill., assignor to Universal Oil Products Company, Chicago, Ill., a corporation of Delaware Application May 15, 1943, Serial No. 487,086

2 Claims. (Cl. 23—288)

1

This invention relates to an improved form of catalytic reactor and more particularly to a reactor which is especially adapted to processes for the dehydrogenation of hydrocarbons.

In processes for the dehydrogenation of hydrocarbons and especially in the process for dehydrogenating butane or butene to butadiene, considerable difficulty has been encountered due to undesirable side reactions which reduce the efficiency of the process. These side reactions, it is believed, are due to excessive thermal conversion reactions which in the present type of reactor is not readily controllable. This is due to the fact that the hot metal surfaces are contacted by the reactant materials to a higher degree than is desirable.

One of the features of the present invention is the provision for heating the catalyst bed without excessive contacting of the hotter metal surfaces with the reactant stream.

Another feature of this invention is the provision for rapidly removing reaction products after they have emerged from the catalyst bed.

Still another feature of the invention is the provision for graduated heating of the catalyst bed. It is desirable in dehydrogenation processes, especially the process for dehydrogenating butene to butadiene, that the reactant material enter the hottest portion of the catalyst bed. This is readily obtainable by means of the present invention.

Broadly, this invention comprises a shell in which is disposed a relatively shallow catalyst bed, means for heating said bed comprising a series of heating tubes spaced therefrom, inlet means for reactant materials, means for distributing said reactant materials to the catalyst bed without substantial contacting of said heating tubes, means for withdrawing reaction products from said shell, means for supplying a heating medium to said heating tubes and means for withdrawing said heating medium from said heating tubes.

In order to make the features and advantages of the present invention more apparent and clearly understood, reference is made to the accompanying diagrammatic drawing and the following description thereof.

Figure 1:
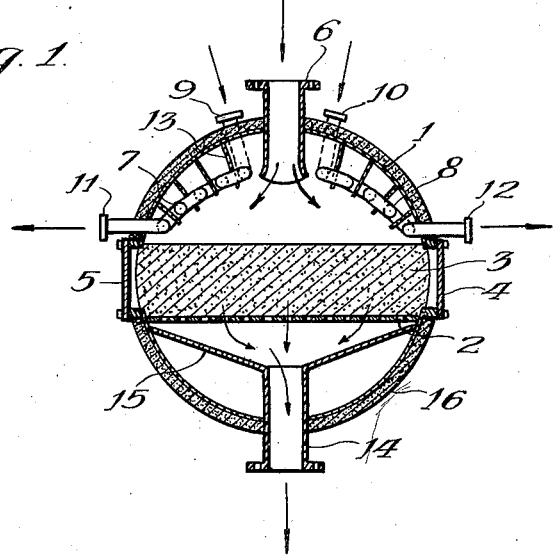
Figure 2:
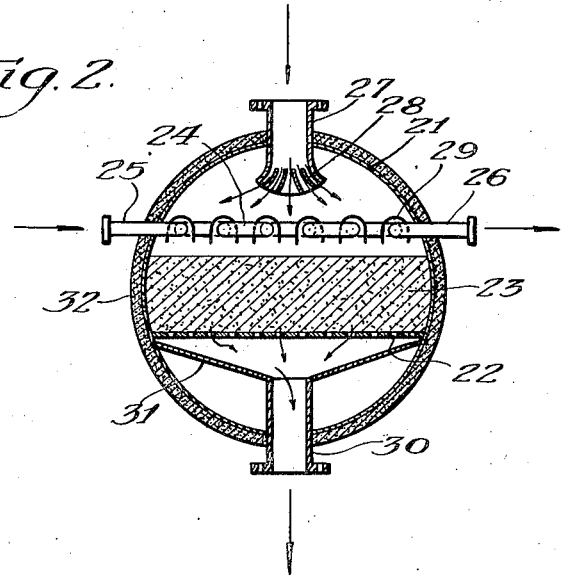

Figures 1 and 2 of the drawing illustrate in cross-sectional views two forms of the present invention.

In Figure 1, the reactor is comprised of a shell 1 which is provided with a perforate member 2 upon which may be disposed a bed of suitable catalytic material 3. Shell 1 is provided with man-holes 4 and 5 through which access may be

2 had to the catalyst bed for the ready removal and replacement of catalyst when desired. The shell is also provided with an inlet conduit 6 through which reactant materials may be introduced to the catalyst bed. Inlet conduit 6 may be flared at its inner-end to facilitate the distribution of reactant materials to the catalyst bed.

Above the catalyst bed in this particular form of the invention are disposed heating coils 7 and 8. A suitable heating medium may be introduced to coils 7 and 8 through conduits 9 and 10 respectively and may be withdrawn through conduits 11 and 12 respectively. The heating tubes comprising coils 7 and 8 are spaced from the catalyst bed and are adapted to heat it principally by radiation. By this arrangement, the catalyst bed will be heated to a higher degree on that side thereof adjacent the heating tubes. This feature as has been mentioned heretofore, is desirable in dehydrogenation processes in that higher efficiency is obtainable when the reactant material enters the catalyst bed in its hottest zone.

In the reactor shown in Figure 1, a plurality of baffles 13 are disposed between the various heating tubes to substantially prevent circulation of reactant materials around the tubes. By this means, contacting of the hot tubes by the incoming reactant stream is substantially prevented thereby overcoming to a great extent much of the undesired thermal conversion.

The reaction products are withdrawn from shell 1 by means of conduit 14 which communicates with the space between perforate member 2 and partitioning member 15. By restricting the size of the cross-sectional area of this space and of conduit 14, a high stream velocity is attained thereby facilitating the rapid removal of the reaction products from the hot reactor and to some extent preventing undesirable side reactions. The outer surface of shell 1 may be lagged with suitable insulating material 16 such as rock wool, magnesia and the like.

Referring now to Figure 2, the form of reactor here illustrated is made up of shell 21 in which is disposed a perforate member 22 which is adapted to support a bed of suitable catalytic material 23. Spaced from the bed of catalytic material and on one side of the shell is a heating coil 24 provided with inlet and outlet conduits 25 and 26 respectively. Shell 21 is provided with an inlet conduit 27 through which the desired reactant materials may be supplied to the catalyst bed. Inlet conduit 27 is flared at its inner-end and is also provided with a plurality of guide vanes 28 to aid in the distribution of reactant material to the catalyst bed. Heating tubes 24 are adapted to heat the catalyst bed principally by radiation and are provided with shields 29 to substantially prevent the incoming reactant materials from contacting the hot tubes.

The reaction products are withdrawn from shell 21 by means of conduit 30 which communicates with the catalyst bed through the space formed between the catalyst bed and partitioning member 31.

The reactor herein illustrated also may be insulated by suitable insulating material 32. The heating medium to be supplied to the heating coils in the two reactors illustrated may comprise molten salt mixtures, combustion products from other processes or the tubes may be adapted to be internally fired.

From the above description of the accompanying drawing, it is readily apparent that the present invention offers a catalytic reactor having a number of advantageous features, the principal ones being a shallow catalyst bed offering a low resistance to the passage of reactant materials, radiant heating of the catalyst bed thereby directly supplying heat to the catalyst for the endothermic heat of reaction, means for preventing substantial contacting of the hotter metal surfaces by the reactant materials and means for rapidly withdrawing the reaction products from the reactor.

I claim as my invention:

1. A catalytic reactor comprising in combination a shell, a relatively shallow catalyst bed disposed within said shell, an inlet conduit projecting into the shell on one side of said bed for supplying a fluid reactant to the bed, heating tubes in the shell on said side of and spaced from the catalyst bed and adapted to heat the bed substantially by radiation, said tubes being disposed out of the path of flow of the fluid reactant from said inlet conduit to the catalyst bed whereby to minimize contact of the reactant with the heating tubes, means for removing reaction products from the shell on the other side of said bed, and means for passing a heating medium through the heating tubes.

2. A catalytic reactor comprising in combination a shell, a relatively shallow catalyst bed disposed within said shell, an inlet conduit projecting into the shell on one side of said bed for supplying a fluid reactant to the bed, heating tubes in the shell on said side of and spaced from the catalyst bed and adapted to heat the bed substantially by radiation, said tubes being disposed adjacent a portion of the shell and out of the path of flow of the fluid reactant from said inlet conduit to the catalyst bed whereby to minimize contact of the reactant with the heating tubes, baffles disposed within the shell in such relation to the heating tubes and said portion of the shell as to substantially prevent circulation of fluid reactant around the tubes, means for removing reaction products from the shell on the other side of said bed, and means for passing a heating medium through the heating tubes.

CHARLES C. WATSON.

REFERENCES CITED

The following references are of record in the file of this patent:

UNITED STATES PATENTS

| Number | Name | Date |
| --- | --- | --- |
| 2,299,197 | West | Oct. 20, 1942 |
| 2,306,011 | Burk et al. | Dec. 22, 1942 |
| 2,397,899 | Witkiewicz | Apr. 2, 1946 |